(12) United States Patent
Dovner

(10) Patent No.: US 9,004,295 B2
(45) Date of Patent: Apr. 14, 2015

(54) EQUIPMENT RACK ASSEMBLY AND METHODS OF USE THEREOF

(76) Inventor: Edward Dovner, Delray Beach, FL (US)

( * ) Notice: Subject to any disclaimer, the term of this patent is extended or adjusted under 35 U.S.C. 154(b) by 0 days.

(21) Appl. No.: 13/472,034

(22) Filed: May 15, 2012

(65) Prior Publication Data

US 2012/0298605 A1 Nov. 29, 2012

Related U.S. Application Data

(63) Continuation-in-part of application No. 13/196,609, filed on Aug. 2, 2011.

(60) Provisional application No. 61/370,045, filed on Aug. 2, 2010.

(51) Int. Cl.
| | |
|---|---|
| *B62H 3/12* | (2006.01) |
| *A47B 57/06* | (2006.01) |
| *A47B 81/00* | (2006.01) |
| *A47B 96/14* | (2006.01) |

(52) U.S. Cl.
CPC *B62H 3/12* (2013.01); *A47B 57/06* (2013.01); *A47B 81/00* (2013.01); *A47B 96/1425* (2013.01)

(58) Field of Classification Search
USPC .................. 211/17, 18, 22, 85.7; 108/147
See application file for complete search history.

(56) References Cited

U.S. PATENT DOCUMENTS

| | | | | |
|---|---|---|---|---|
| 478,805 | A * | 7/1892 | Munson | 211/22 |
| 706,718 | A * | 8/1902 | Bradbury | 211/22 |
| 1,667,669 | A * | 4/1928 | Megee | 211/24 |
| 3,228,646 | A * | 1/1966 | Lane et al. | 248/354.3 |
| 3,770,133 | A | 11/1973 | Kolker | |
| 4,552,270 | A * | 11/1985 | Lentz et al. | 211/17 |
| 5,044,505 | A * | 9/1991 | Spratt | 211/22 |
| 5,083,729 | A * | 1/1992 | Saeks et al. | 211/22 |
| 5,086,930 | A * | 2/1992 | Saeks | 211/17 |
| 5,183,162 | A | 2/1993 | Ritzenthaler | |
| 5,294,006 | A * | 3/1994 | Deschino | 211/18 |
| 5,492,228 | A * | 2/1996 | Botkin | 211/85.7 |
| 5,657,884 | A * | 8/1997 | Zilincar, III | 211/86.01 |
| 5,772,048 | A | 6/1998 | Sopcisak | |
| 5,800,294 | A | 9/1998 | Naecker, Jr. | |
| 5,845,788 | A | 12/1998 | Robolin | |
| 6,095,344 | A * | 8/2000 | White | 211/17 |

(Continued)

OTHER PUBLICATIONS

International Search Report from International Application No. PCT/US2011/046301 dated Jan. 10, 2012.

*Primary Examiner* — Jose V Chen
(74) *Attorney, Agent, or Firm* — Greenberg Traurig, LLP

(57) ABSTRACT

An equipment rack assembly having a member; a first securing assembly, where the first securing assembly is operationally connected to the member; a second securing assembly, where the second securing assembly is operationally connected to the member; and an equipment pulling assembly having a first part and a second part, where the first part of equipment pulling assembly is operationally connected to the first securing assembly and the second part of equipment pulling assembly is operationally connected to the second securing assembly; and where the equipment pulling assembly includes a movable cable and a hanger that is operationally connected to the cable, where equipment is attached to the hanger so that the equipment can be moved between the first part and the second part of equipment pulling assembly while being hanged on the equipment rack assembly.

18 Claims, 15 Drawing Sheets

(56) References Cited

U.S. PATENT DOCUMENTS

| | | |
|---|---|---|
| 6,161,702 A | 12/2000 | Campbell |
| 6,164,459 A * | 12/2000 | Liem .................. 211/5 |
| 6,390,309 B1 * | 5/2002 | Tucker .................. 211/85.7 |
| 6,637,602 B2 * | 10/2003 | Dueck .................. 211/17 |
| 6,820,842 B1 | 11/2004 | Chuang |
| D533,743 S * | 12/2006 | Eastman .................. D6/552 |
| 7,434,674 B1 | 10/2008 | Bain |
| 8,047,492 B2 * | 11/2011 | Wang .................. 248/307 |
| 8,437,873 B2 * | 5/2013 | North .................. 700/215 |
| 2002/0005390 A1 * | 1/2002 | DeRocher et al. .......... 211/85.7 |
| 2003/0178382 A1 * | 9/2003 | Tucker .................. 211/85.7 |
| 2007/0029267 A1 | 2/2007 | Hall et al. |
| 2007/0057001 A1 * | 3/2007 | Wang .................. 224/536 |
| 2008/0067209 A1 | 3/2008 | Gunn |
| 2010/0237027 A1 * | 9/2010 | Shaha et al. .................. 211/17 |
| 2012/0024802 A1 | 2/2012 | Dovner |

* cited by examiner

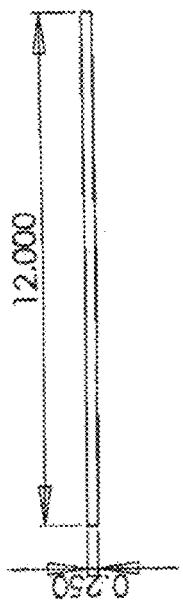
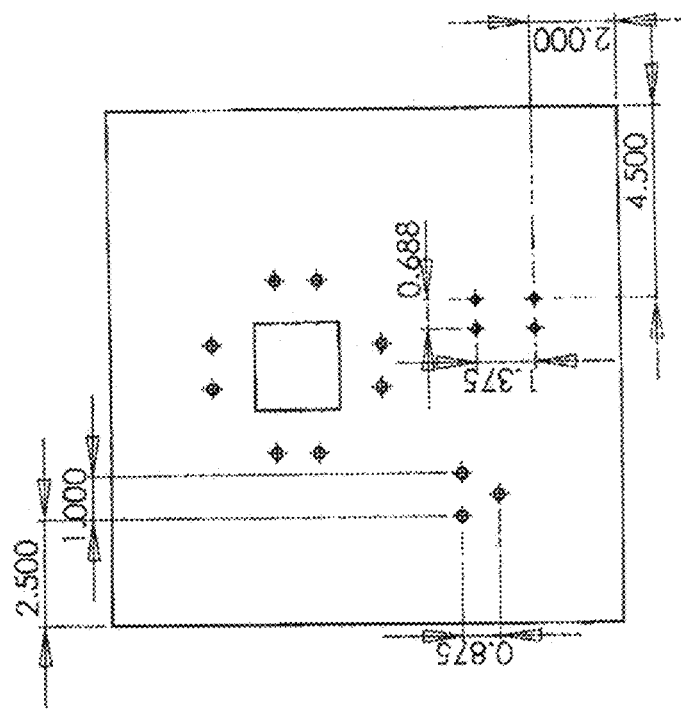
Fig. 3A
Fig. 3B

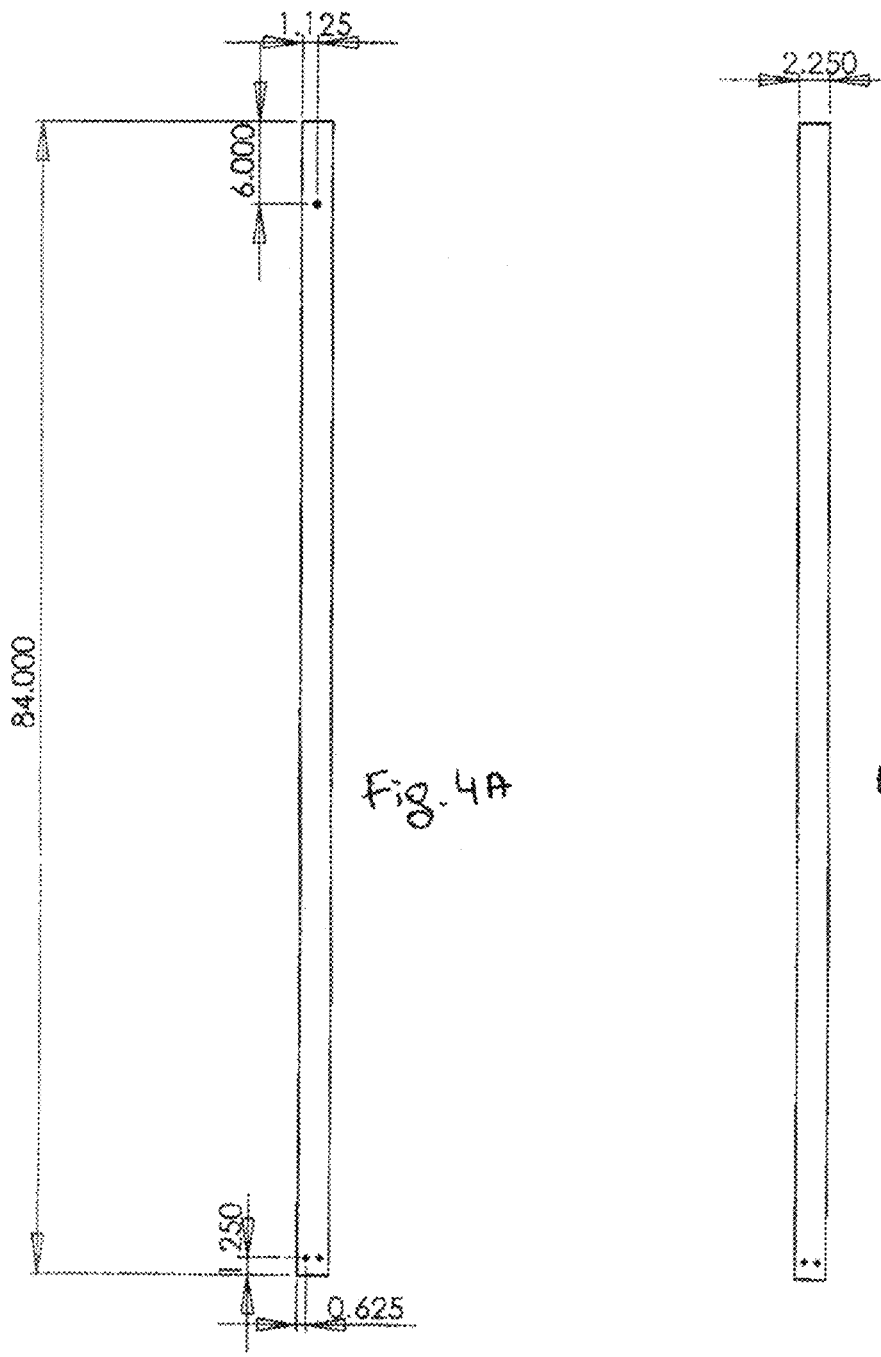

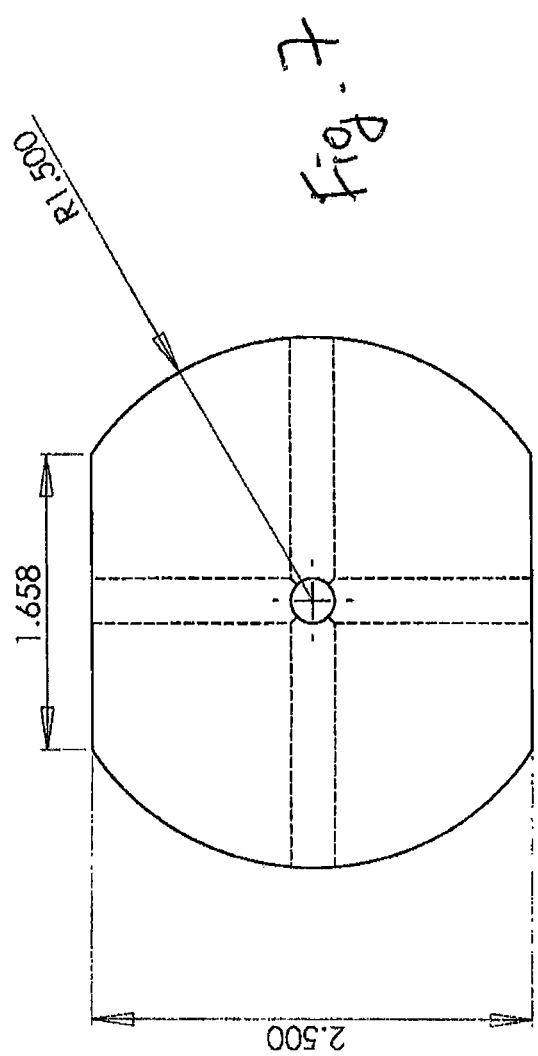

EQUIPMENT RACK ASSEMBLY AND METHODS OF USE THEREOF

RELATED APPLICATIONS

This application is a continuation-in-part of U.S. application Ser. No. 13/196,609, entitled "A BICYCLE RACK ASSEMBLY AND METHODS OF USE THEREOF," filed Aug. 2, 2011 which claims the benefit of U.S. provisional application Ser. No. 61/370,045, entitled "A VERTICAL BIKE RACK ASSEMBLY AND METHODS OF USE THEREOF," filed Aug. 2, 2010, both of which are hereby incorporated by reference herein in their entirety for all purposes.

TECHNICAL FIELD

The present invention relates to assemblies for storing equipment such as bicycles and bicycle-related equipment, canoes, kayaks, coolers, life jackets, skis, lawn equipment, snow blowers, skates, skate boards, and scooters.

BACKGROUND

Between uses, equipment can be hanged individually from a wall of a garage or a house, placed against the wall, laid on the ground, or fixed upright position.

SUMMARY OF INVENTION

In some embodiments, the instant invention includes at least one equipment rack assembly that consists of at least the following components: a first member having a first and a second ends; a second member having a first and a second ends, wherein the first member telescopically advances within and out of an inside cavity of the second member through the first end of the second member so that the first end of the first member moves within the inside cavity of the second member and the second end of the first member is positioned outside of the inside cavity of the second member; a first member securing assembly, wherein the first member securing assembly is operationally: 1) connected to the second end of the first member, and 2) attached to at least one first side of a structure within which the equipment rack assembly is placed; a second member securing assembly, wherein the second member securing assembly is operationally: 1) connected to the second end of the second member, and 2) attached to at least one second side of the structure within which the equipment rack assembly is placed; and a equipment pulling assembly having a first part and a second part, wherein the first part of equipment pulling assembly is operationally connected to the first member securing assembly and the second part of equipment pulling assembly is operationally connected to the second member securing assembly, and wherein the equipment pulling assembly that at least includes: 1) at least one movable cable that moves between the first part and the second part of equipment pulling assembly, and 2) at least one hanger that is operationally connected to the at least one movable cable, wherein equipment is attached to the at least one hanger so that the equipment can be moved between the first part and the second part of the equipment pulling assembly while being hanged on the at least one equipment rack assembly.

In other embodiments, the equipment may include a bicycle, bicycle-related equipment, a canoe, a kayak, a cooler, a life jacket, a ski, lawn equipment, a skate, a skate board, a scooter or combinations thereof.

Some embodiments include two equipment rack assemblies. Some embodiments include a plurality of equipment rack assemblies.

In some embodiments, the hanger has at least one projection for hanging equipment. In some embodiments, the equipment hanging on the projection includes a bicycle, bicycle-related equipment, a canoe, a kayak, a cooler, a life jacket, a ski, lawn equipment, a skate, a skate board, a scooter or combinations thereof.

In some embodiments, the hanger includes a plurality of projections for hanging equipment. In some embodiments, the projections are hook-shaped, J-shaped, U-shaped, L-shaped, or combinations thereof.

In some embodiments, the projection is formed of polymeric material, metal, wood, or combinations thereof. In some embodiments, the projection is formed of thermoplastic.

In some embodiments, the hanger further comprises a hanger bar. In some embodiments, the projection is connected to the hanger bar so that the at least one projection is fixed to the hanger bar. In some embodiments, the projection is connected to the hanger bar so that the projection can rotate around the hanger bar.

In some embodiments, the projection further includes a device for securing the equipment to the hanger. In some embodiments, the device for securing equipment to the hanger is a collar capable of releasable connection to the projection. In some embodiments, the device for securing equipment is formed of a polymeric material, metal, wood, or combinations thereof. In some embodiments, the device for securing equipment is formed of rubber.

BRIEF DESCRIPTION OF THE DRAWINGS

FIGS. 3A and 3B illustrate yet another embodiment of the present invention.

FIGS. 4A and 4B illustrate yet another embodiment of the present invention.

FIG. 6 illustrates yet another embodiment of the present invention.

FIG. 7 illustrates yet another embodiment of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Figure 1A:
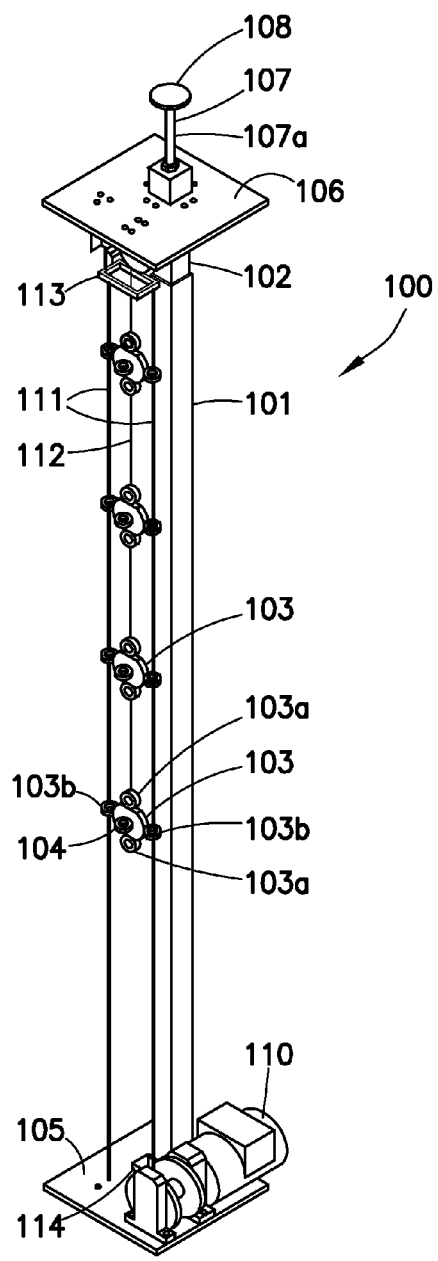
FIGS. 1A and 1B illustrate one embodiment of the present invention.
Figure 1B:
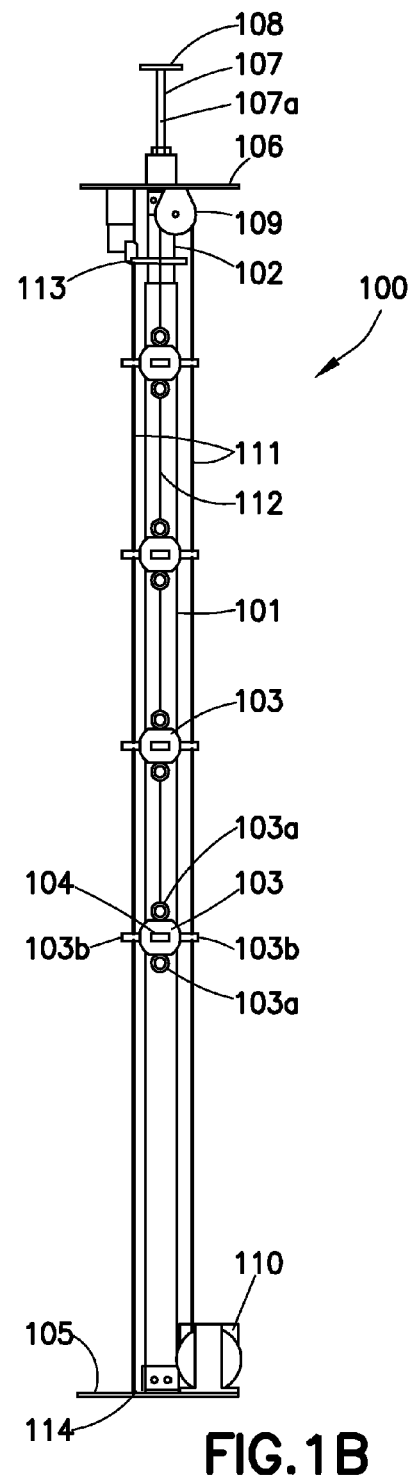

In one example, as shown in FIGS. 1A-1B, an equipment rack assembly can include at least an external vertical pole 101 and an internal vertical pole 102. In one example, the pole 102 is operatively positioned within the pole 101 in manner that allows pole 102 to move within the inner cavity of the pole 101 and also to extend from at least one side to the pole 101 in a telescopic fashion. In one example, the poles 101 and 102 have correspondingly similar cross-sections (e.g. square, circular, or other). In one example, the poles 101 and 102 have correspondingly different cross-sections.

In one example, the pole 102 extends from the pole 101 for a desirable distance up to almost full length of the pole 102, while the poles 101 and 102 are stably secured to each other. In one example, the pole 102 extends from the pole 101 for a desirable distance with an assistance from a mechanical device, such as squeezing wheel. In one example, the pole 102 extends from the pole 101 for a desirable distance with an assistance from a pneumatic device, such as air compressor. In one example, the pole 102 extends from the pole 101 for a desirable distance with an assistance from a device driven by electrical force.

In one example, the vertical pole 102 is operationally connected to the top plate 106 through a bracket 113. In one example, the vertical pole 101 is operationally connected to the bottom plate 105 through a bracket 114.

In one example, the inventive assembly includes at least one connector 103 on which equipment can be operationally hanged. In one example, the connector 103 has at least one hanger 104 to which equipment is attached. In one example, equipment is attached to the at least one hanger 104 by way of a strap. In one example, the at least one hanger 104 has a hook-like shape on which equipment is hanged.

In one example, the pole 101 can be operationally connected to a bottom plate 105. In one example, the pole 102 is operationally connected to a bottom side of a top plate 106. In one example, there is knob 107 that includes a pin 107a extending from the a top side of the top plate 106 and ending in a head 108. In one example, when the invention equipment rack is installed, the head 108 presses, for example, against a ceiling, thus providing additional rigidity to the equipment rack assembly. In one example, a height of the pin 107a of the knob 107 is adjusted to provide tight attachment of the inventive assembly to ceiling.

In one example, the invention assembly includes a pulling mechanism that facilities the pulling of the hanged equipment up along the equipment rack assembly. In one example, as shown in FIGS. 1A and 1B, the pulling mechanism includes at least a pulley 109 which is operationally connected to the bottom side of the top plate 106. In one example, the pulling mechanism further includes an electrical motor 110, positioned on the top side of the bottom plate 105. In one example, the at least one connector 103 is operationally connected to the motor 110 by cable(s) 111 through the pulley 109. In one example, during an operation of the inventive assembly, equipment is attached to connector 103 at the hanger 104. In one example, during the operation, as the connector 103 being pulled up along the inventive assembly, ears 103b on sides of the connector 103 slide along the cable(s) 111.

In one example, when there are at least two connectors 103, the connectors are connected to each other, for example, by a cable (112) attached to extensions 103a of the successive connectors, thus allowing to increase more equipment to be hanged on the inventive assembly. In one example, the inventive equipment rack assembly can be extended from 8 feet to 14 feet, by extending the internal vertical pole 102 and placing the pin 107a of knob 107 to the desired height.

Figure 2:
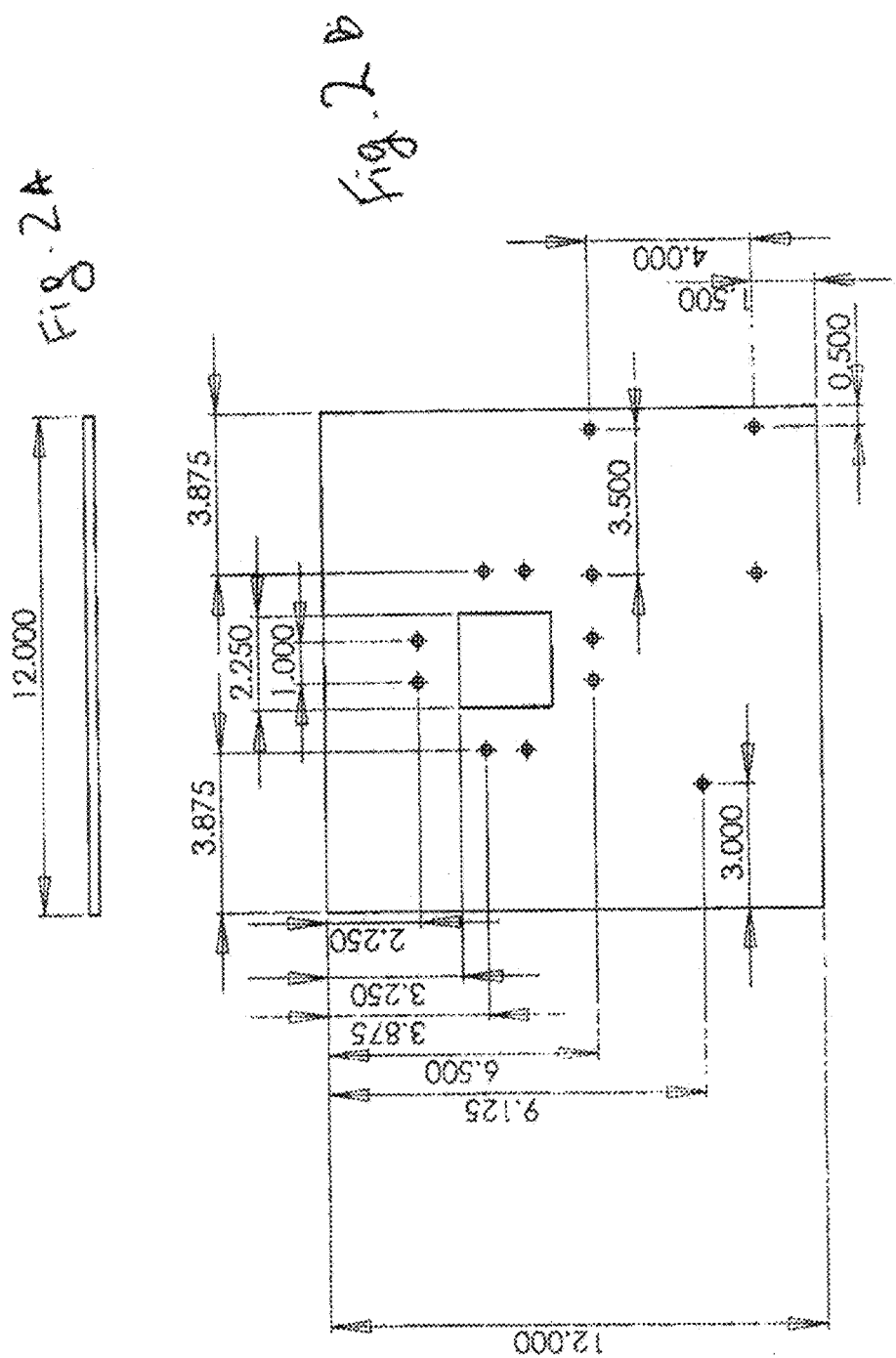
FIGS. 2A and 2B illustrate another embodiment of the present invention.

FIGS. 2A and 2B illustrate different views of an embodiment of the bottom plate 105 of the inventive equipment rack assembly.

FIGS. 3A and 3B illustrate different views of an embodiment of the top plate 106 of the inventive equipment rack assembly.

FIGS. 4A and 4B illustrate different views of an embodiment of the internal vertical pole 102 of the inventive equipment rack assembly.

Figure 5A:
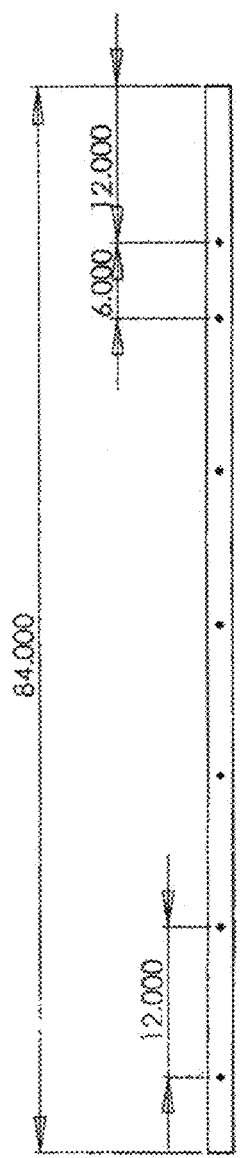
FIGS. 5A and 5B illustrate yet another embodiment of the present invention.
Figure 5B:
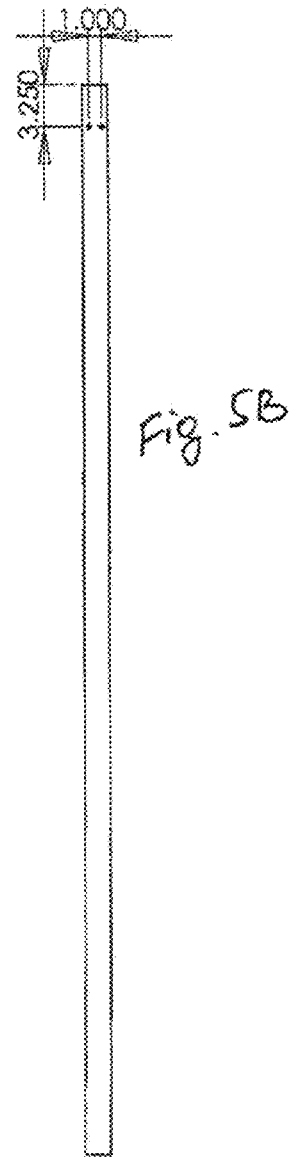
Figure 9:
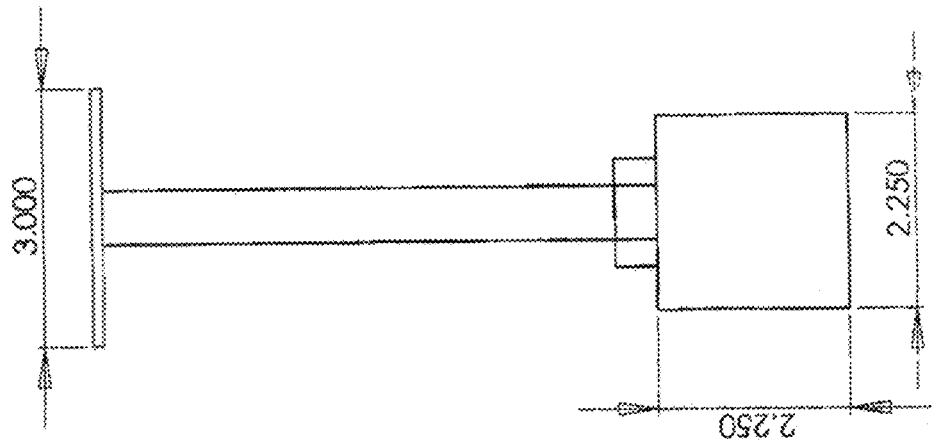
FIGS. 9A and 9B illustrate yet another embodiment of the present invention.

FIGS. 5A and 5B illustrate different views of an embodiment of the external vertical pole 102 of the inventive equipment rack assembly.

FIG. 6 illustrates an embodiment of the knob 107 of the inventive equipment rack assembly.

FIG. 7 illustrates an embodiment of the connector 103 of the inventive equipment rack assembly.

Figure 8B:
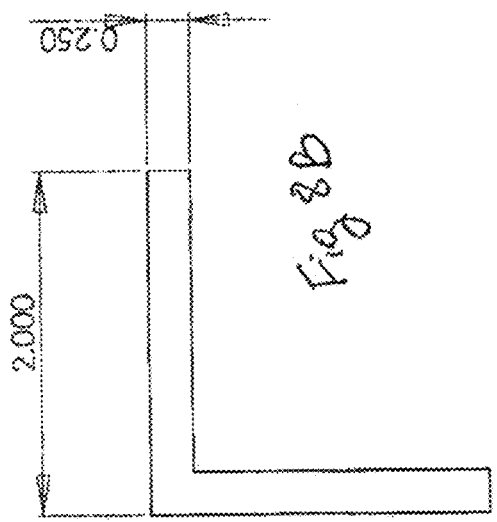
FIGS. 8A and 8B illustrate yet another embodiment of the present invention.
Figure 8A:
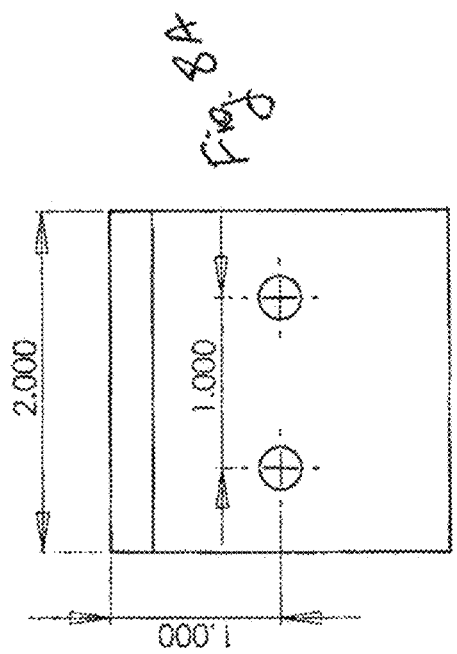

FIGS. 8A and 8B illustrate different views of an embodiment of the bracket 113 of the inventive equipment rack assembly.

Figure 9B:
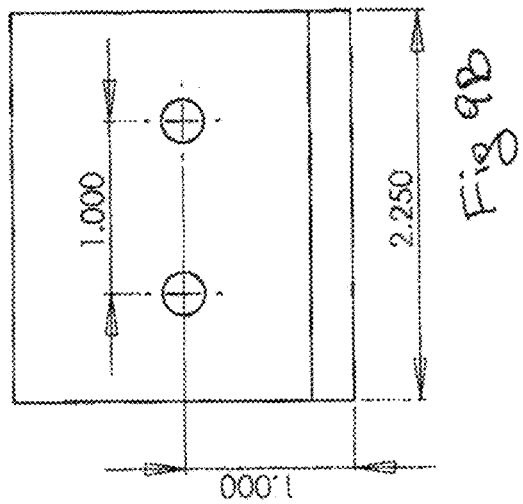
Figure 9A:
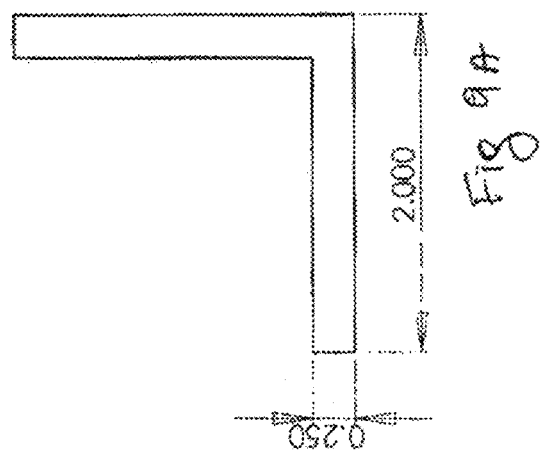

FIGS. 9A and 9B illustrate different views of an embodiment of the bracket 114 of the inventive equipment rack assembly.

Figure 10:
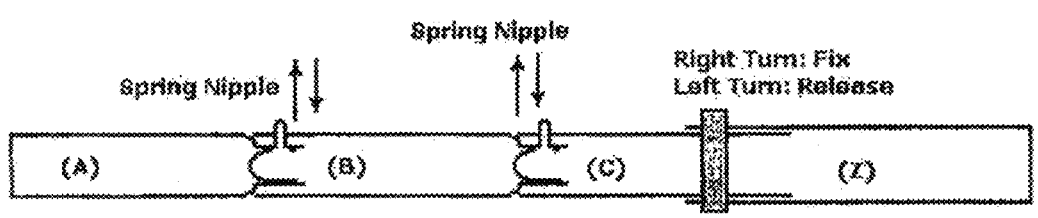
FIG. 10 illustrates yet another embodiment of the present invention.

FIG. 10 illustrates another embodiment of the inventive equipment rack assembly. As FIG. 10 shows, the inventive assembly can be extended to a desired height by adding successive sections. In one example, section C is operationally position within at least a portion of section Z and can be extended from one side of the section Z to a desired height. In one example, the height to which the section C can be extended is adjusted by an adjustment mechanism (e.g. lever, squeezing wheel, etc.). As shown in FIG. 10, in one example the adjustment mechanism functions to fix the position of the section C when it is turned to the right and allow movement of the section C within the section Z when it is turned to the left.

In one example, any number of additional sections (e.g. sections A, B, etc.) can be attached to the section C, thus extending the height of the inventive equipment rack assembly. In one example, a length of each section to be added to section C can be selected to obtain a total desired height of the inventive assembly. In one example, a length of each section to be added to section C varies from 1 to 5 feet. In one example, the successive section(s) is (are) attached to the section C using any suitable attachment mechanism. In one example, the attachment mechanism to add successive section(s) can be spring nipple mechanism, show in FIG. 10.

Figures 11A, 11B:
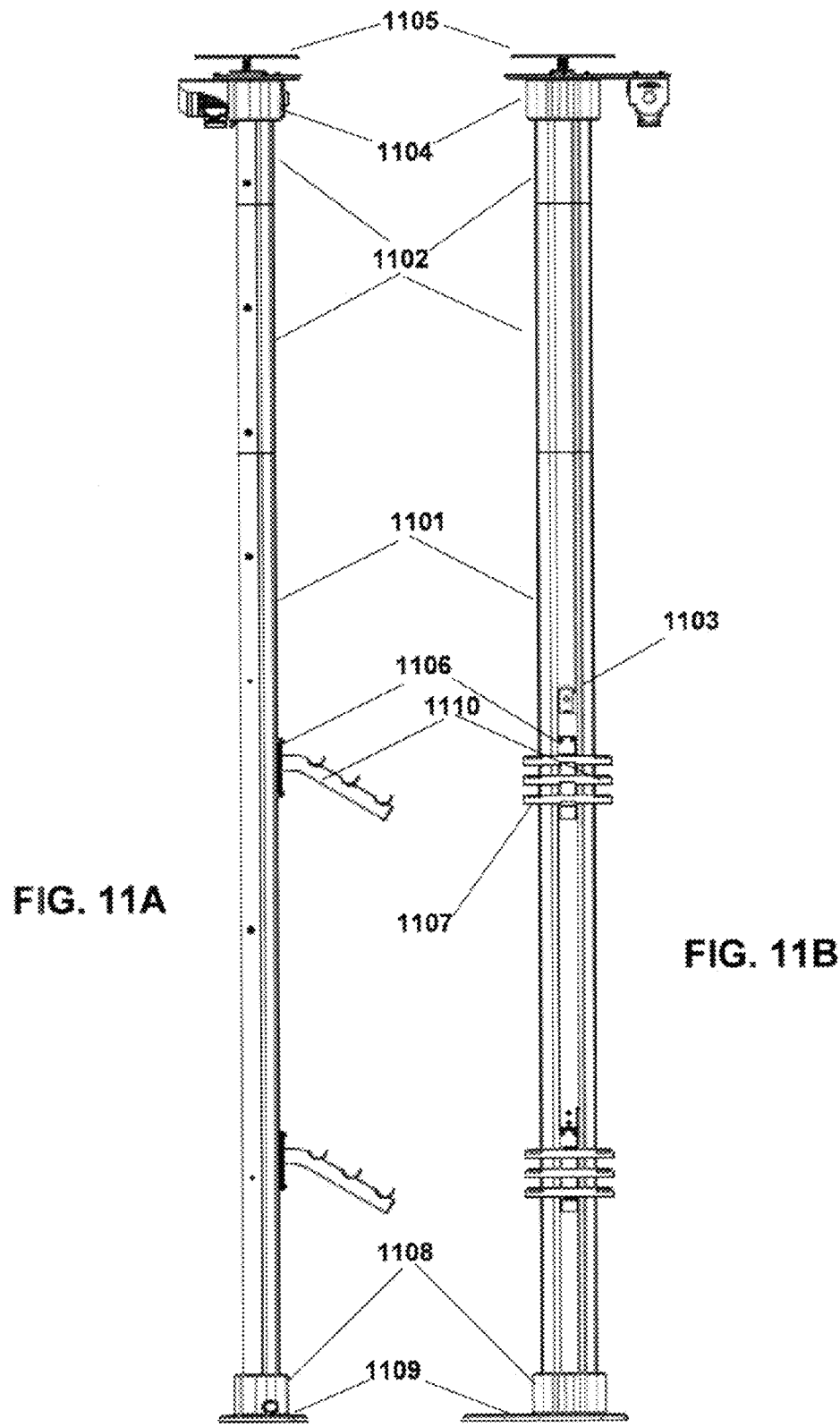
FIGS. 11A and 11B illustrate yet another embodiment of the present invention.

In one example, as shown in FIGS. 11A-11B, an embodiment of a equipment rack assembly can include at least a pole 1101 (which can be extruded) whose length can be adjusted, as desired, by adding or removing sections 1102. In one example, at one end, the pole 1101 is operationally connected to a base 1108 that operationally rests on a based plate 1109 which can be placed on the ground, for example, in a garage. In one example, at the other end, the pole 1101 is operationally connected to another base 1104 that operationally connected to a brace assembly 1105, made from a brace place, a brace support post cap, and a brace threaded rod. rests on a based plate 1109 which can be placed on the ground, for example, in a garage. In one example, the brace assembly 1105 is placed, for example, against a ceiling of the garage. In one example, there is a mechanism that moves a chain or rope that travels inside the pole 1101 between the bases 1004 and 1108. In one example, the chain or rope travels within extruded channels 1103 inside the pole 1101. In one example, the mechanism that moves the chain is operated by an electrical motor, operationally connected to either base 1104 or the base 1108. In one example, at least one block 1106 is operationally linked to the moving chain and moves up and down. In one example, the block 1106 is connected to a hanger 1110 that supports at least one bike rack tube 1107.

Figure 12:
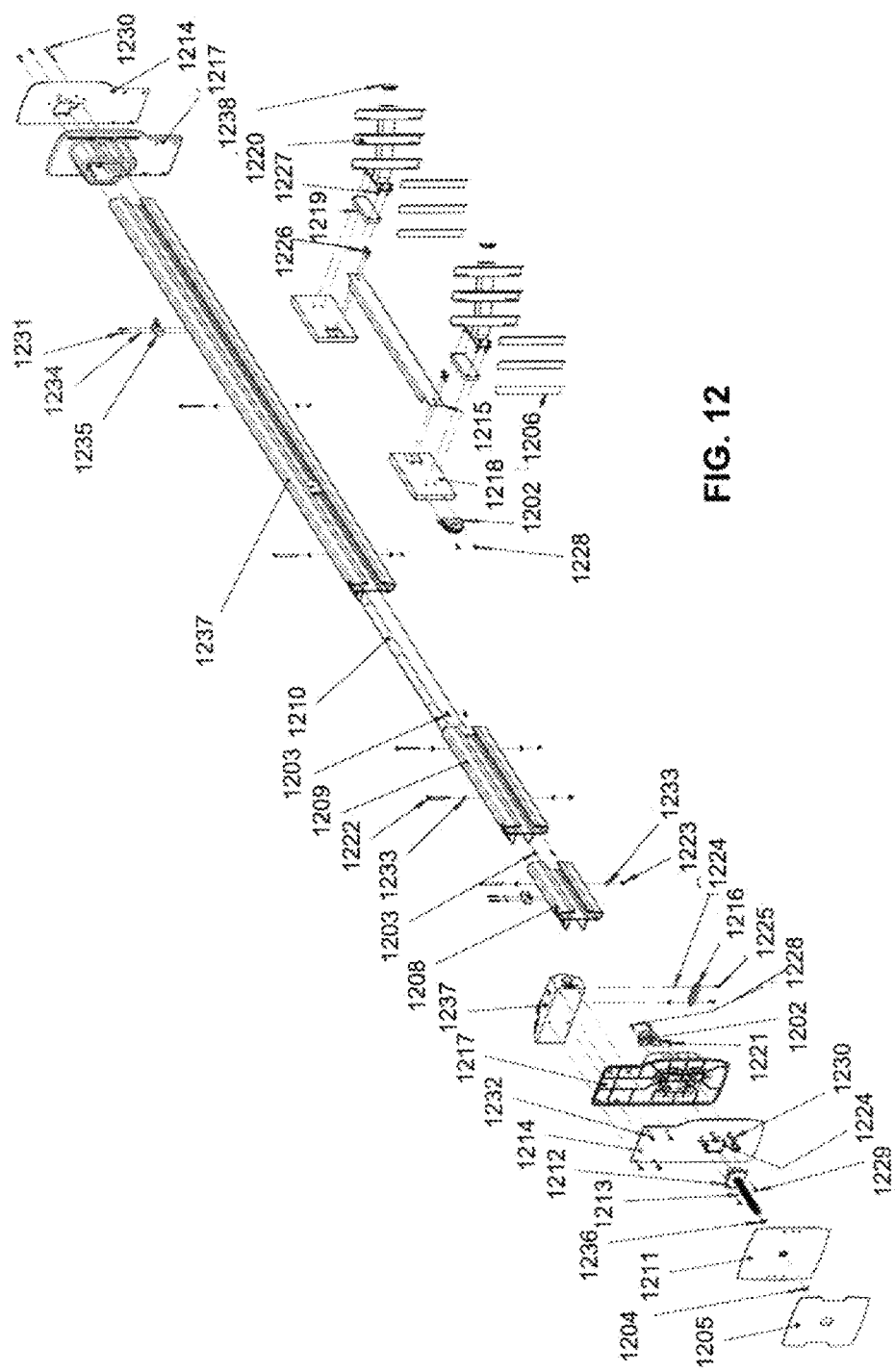
FIG. 12 illustrates yet another embodiment of the present invention.

In one example, as shown in FIG. 12, an embodiment of a equipment rack assembly includes at least one pulley 1201, flat mount, galvanized iron, about 1-⅜ inches outer diameter having about 5/16 inch rope. In one example, the embodiment of the equipment rack assembly further includes at least one pulley 1202, flat mount, galvanized steel, about 2 inch outer diameter, having about ¼ inch rope. In one example, the embodiment of the equipment rack assembly further includes at least one spring pin 1203, slotted, about 3/16 inch diameter, about 1 inch length, made from 18-8 SS material. In one example, the embodiment of the equipment rack assembly further includes at least one retaining ring 1204, E-style, external, having about ½ inch shaft. In one example, the embodiment of the equipment rack assembly further includes at least one gasket 1205, a brace plate. In one example, the embodiment of the equipment rack assembly further includes at least one gasket 1206, a bike rack tube. In one example, the embodiment of the equipment rack assembly further includes at least one main extrusion rail 1207, about 8 feet. In one example, the embodiment of the equipment rack assembly further includes at least one extension extrusion rail 1208, about 1 foot. In one example, the embodiment of the equipment rack assembly further includes at least one extension extrusion rail 1209, about 2 feet. In one example, the embodiment of the equipment rack assembly further includes at least one support beam 1210, in form of 2 inch×2 inch tube. In one example, the embodiment of the equipment rack assembly further includes at least one brace plate 1211. In one example, the embodiment of the equipment rack assembly further includes at least one brace support post cap 1212. In one example, the embodiment of the equipment rack assembly further includes at least one brace threaded rod 1213. In one example, the embodiment of the equipment rack assembly further includes at least one base plate 1214. In one example, the embodiment of the equipment rack assembly further includes at least one block link bracket 1215. In one example, the embodiment of the equipment rack assembly further includes at least one fairlead hawse 1216. In one example, the embodiment of the equipment rack assembly further includes at least one base 1217. In one example, the embodiment of the equipment rack assembly further includes at least one block 1218. In one example, the embodiment of the equipment rack assembly further includes at least one block receiver 1219. In one example, the embodiment of the equipment rack assembly further includes at least one bike rack weldment 1220. In one example, the embodiment of the equipment rack assembly further includes at least one eyebolt 1221, #10-32×, ¾ inch shank long. In one example, the embodiment of the equipment rack assembly further includes at least one hex bolt 1222, /4 inch-20×2.75 inch length. In one example, the embodiment of the equipment rack assembly further includes k-locks 1223-1224. In one example, the embodiment of the equipment rack assembly further includes a plurality of screws 1225-1232. In one example, the embodiment of the equipment rack assembly further includes a plurality of washers 1233-1234. In one example, the embodiment of the equipment rack assembly further includes at least one switch 1235, heavy-duty snap action, lever with roller actuator. In one example, the embodiment of the equipment rack assembly further includes at least one clip bearing 1236, ½ inch internal diameter and 0.138 tall. In one example, the embodiment of the equipment rack assembly further includes at least one hoist 1237, having specification of 120V, 60 Hz, 110 lb., single-220 dbl, and 0.08 wire rope. In one example, the embodiment of the equipment rack assembly further includes at least one cap plug 1238.

In some embodiments, the instant invention includes a equipment rack assembly that consists of at least the following components: a first member having a first and a second ends; a second member having a first and a second ends, wherein the first member telescopically advances within and out of an inside cavity of the second member through the first end of the second member so that the first end of the first member moves within the inside cavity of the second member and the second end of the first member is positioned outside of the inside cavity of the second member; a first member securing assembly, wherein the first member securing assembly is operationally: 1) connected to the second end of the first member, and 2) attached to at least one first side of a structure within which the equipment rack assembly is placed; a second member securing assembly, wherein the second member securing assembly is operationally: 1) connected to the second end of the second member, and 2) attached to at least one second side of the structure within which the equipment rack assembly is placed; and a equipment pulling assembly having a first part and a second part, wherein the first part of equipment pulling assembly is operationally connected to the first member securing assembly and the second part of equipment pulling assembly is operationally connected to the second member securing assembly, and wherein the equipment pulling assembly that at least includes: 1) at least one movable cable that moves between the first part and the second part of equipment pulling assembly, and 2) at least one hanger that is operationally connected to the at least one movable cable, wherein a plurality of equipments are attached to the at least one hanger so that the plurality of equipments can be moved between the first part and the second part of equipment pulling assembly while being hanged on the equipment rack assembly.

In some embodiments, the at least one first side of the structure and the at least one second side of the structure are at least two side walls of the structure. In some embodiments, the at least one first side of the structure is a ceiling of the structure and the at least one second side of the structure is a floor of the structure.

In some embodiments, the equipment pulling assembly is operationally connected to at least one mechanical pulling device that causes the at least one movable cable to move between the first part and the second part of equipment pulling assembly. In some embodiments, the equipment pulling assembly is operationally connected to at least one pneumatic pulling device that causes the at least one movable cable to move between the first part and the second part of equipment pulling assembly. In some embodiments, the equipment pulling assembly is operationally connected to at least one electrically-driven pulling device that causes the at least one movable cable to move between the first part and the second part of equipment pulling assembly.

In some embodiments, the first member securing assembly further includes a plate that is operationally connected to the second end of the first member at a bottom side of the plate; a pin having a first and a send ends, wherein the first end of the pin is operationally connected to a top side of the plate and wherein the second end of the pin extends away from the top side of the plate; and a knob that is operationally: 1) connected to the second end of the pin, and 2) attached to the at least one first side of the structure within which the equipment rack assembly is placed.

In some embodiments, a length of first member is operationally adjusted by adding or removing at least one first section. In some embodiments, the at least one first section is added to or removed from the first member by employing at least one spring nipple mechanism. In some embodiments, a length of second member is operationally adjusted by adding or removing at least one second section. In some embodiments, the at least one second section is added to or removed from the second member by employing at least one second spring nipple mechanism.

In some embodiments, the inventive equipment rack assembly can further consist of: at least one adjustment mechanism that is operationally connected to the first and the second members, wherein the at least one adjustment mechanism having a first operational state and a second operational state, wherein, in the first operational state, the at least one adjustment mechanism fixes the advancement of the first member within the inside cavity of the second member at a first position, and wherein, in the second operational state, the at least one adjustment mechanism allows the advancement of the first member within the inside cavity of the second member. In some embodiments, the at least one adjustment mechanism is a lever.

In some embodiments, the instant invention includes a equipment rack assembly that consists of at least the following components: a member having a first and a second ends; a first securing assembly, wherein the first securing assembly is operationally: 1) connected to the first end of the member, and 2) attached to at least one first side of a structure within which the equipment rack assembly is placed; a second securing assembly, wherein the second securing assembly is operationally: 1) connected to the second end of the member, and 2) attached to at least one second side of the structure within which the equipment rack assembly is placed; and a equipment pulling assembly having a first part and a second part, wherein the first part of equipment pulling assembly is operationally connected to the first securing assembly and the second part of equipment pulling assembly is operationally connected to the second securing assembly, and wherein the equipment pulling assembly that at least includes: 1) at least one movable cable that moves between the first part and the second part of equipment pulling assembly, and 2) at least one hanger that is operationally connected to the at least one movable cable, wherein a plurality of equipment are attached to the at least one hanger so that the plurality of equipment can be moved between the first part and the second part of equipment pulling assembly while being hanged on the equipment rack assembly.

Figures 13A, 13B:
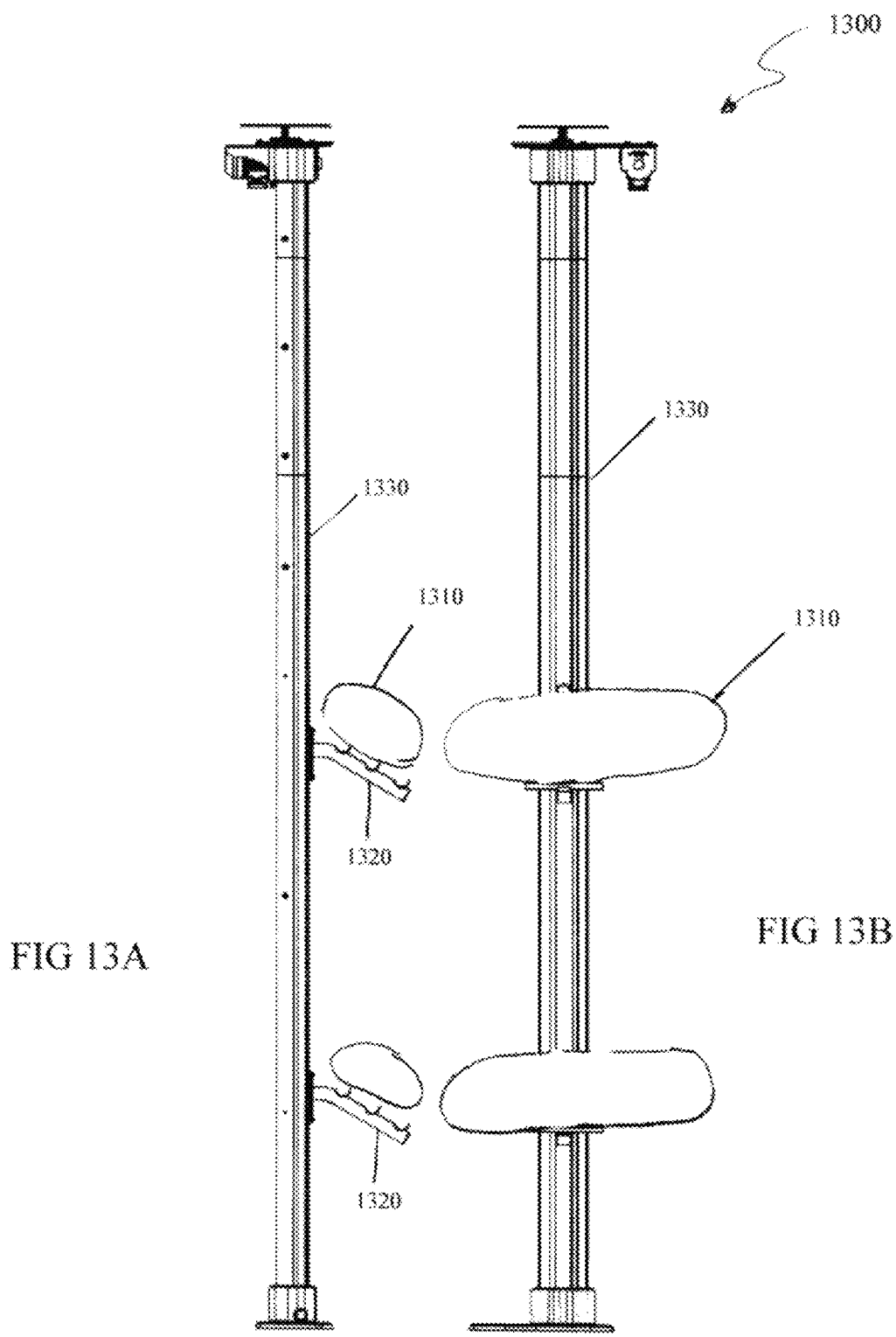
FIGS. 13A and 13B illustrate one embodiment of the present invention.

Some embodiments include equipment rack assemblies for storing bicycles. However, the equipment rack assemblies are not limited to storing bicycles and can include storage of other types of equipment including, but not limited to, bicycle-related equipment such as air pumps, wheels, seats, helmets, gloves, water pack, canoes, kayaks, coolers, life jackets, skis, lawn equipment such as lawn mowers, hedging and weed removal equipment, snow blowers, skates, skate boards, and scooters. In one embodiment shown in FIGS. 13A and 13B, at least one equipment rack assembly 1300 can be used for storing equipment 1310 such as bicycles and bicycle-related equipment, canoes, kayaks, coolers, life jackets, skis, lawn equipment, snow blowers, skates, skate boards, and scooters. The at least one equipment rack assembly 1300 includes at least one hanger 1320 connected to at least one pole 1330 for supporting the equipment. The equipment 1310 can be supported on the hanger 1320 connected to the at least one pole 1330 as shown on FIGS. 13A and 13B.

Figure 14:
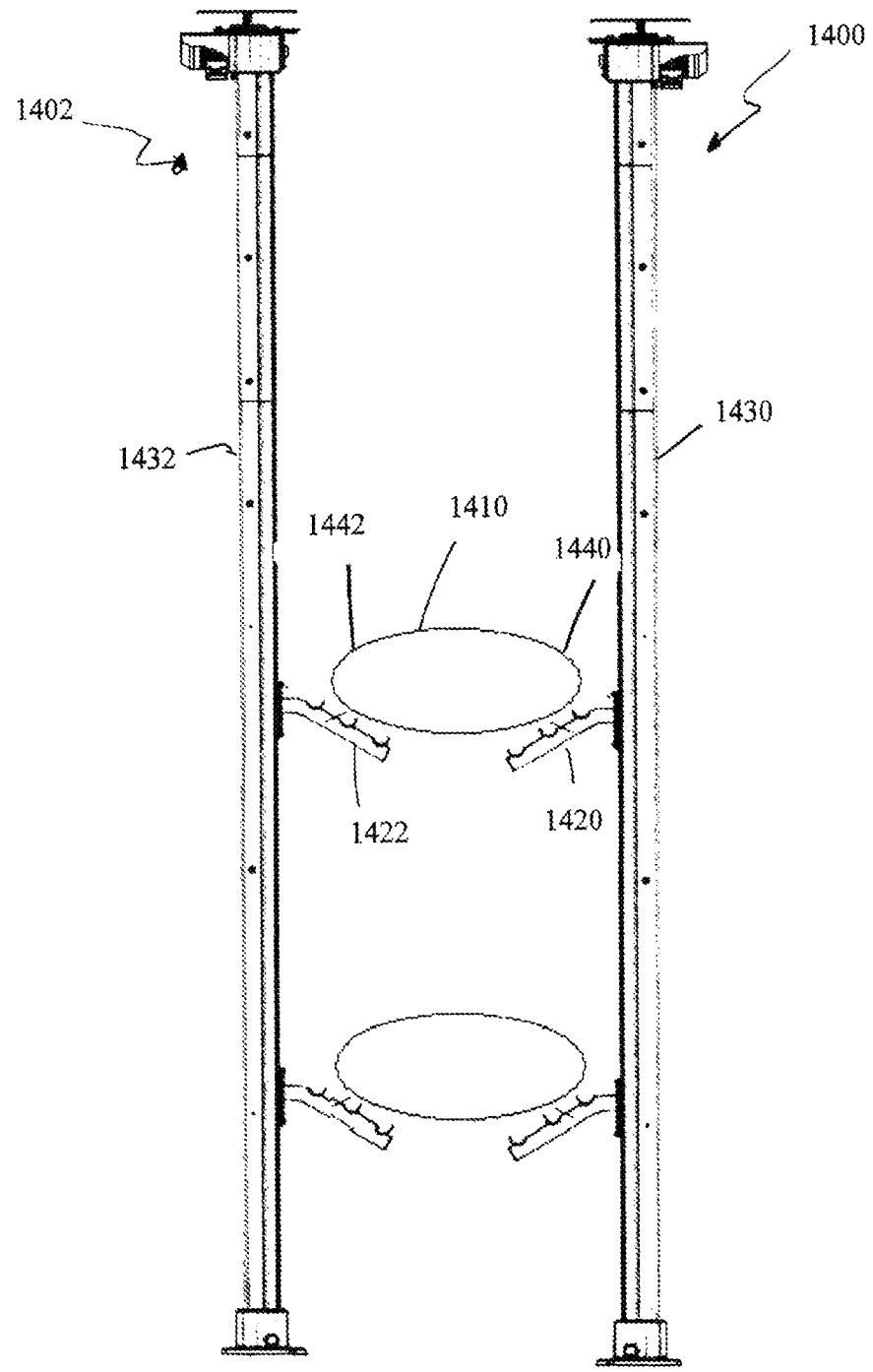
FIG. 14 illustrates another embodiment of the present invention.

In another embodiment shown in FIG. 14, two equipment rack assemblies 1400 and 1402 can be used for storing equipment 1410 such as bicycles and bicycle-related equipment, canoes, kayaks, coolers, life jackets, skis, lawn equipment, snow blowers, skates, skate boards, and scooters. Equipment rack assemblies 1400 and 1402 each can include at least one hanger 1420, 1422 connected to at least one pole, 1430, 1432 for supporting the equipment 1410. In the embodiment, the equipment rack assemblies 1400 and 1402 can be positioned such that each end 1440, 1442 of the equipment 1410 is supported by the hangers 1420 and 1422.

In another embodiment, more than two equipment rack assemblies may be used for storage of equipment. This embodiment (not shown) may be used for storing heavy or oddly shaped equipment, but may also be used for more securely storing equipment.

Figure 15A:
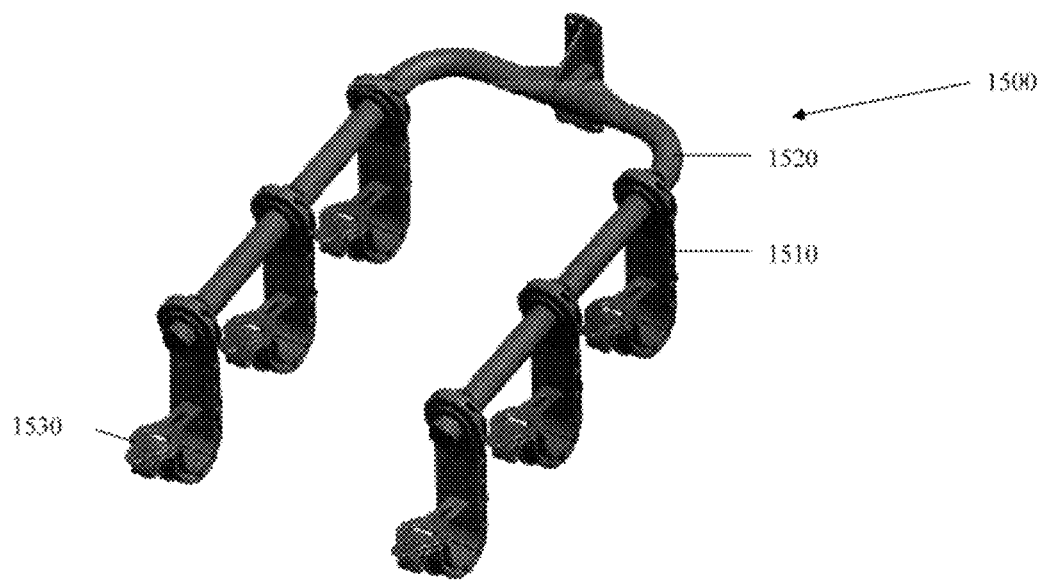
FIGS. 15A and 15B illustrate yet another embodiment of the present invention.
Figure 15B:
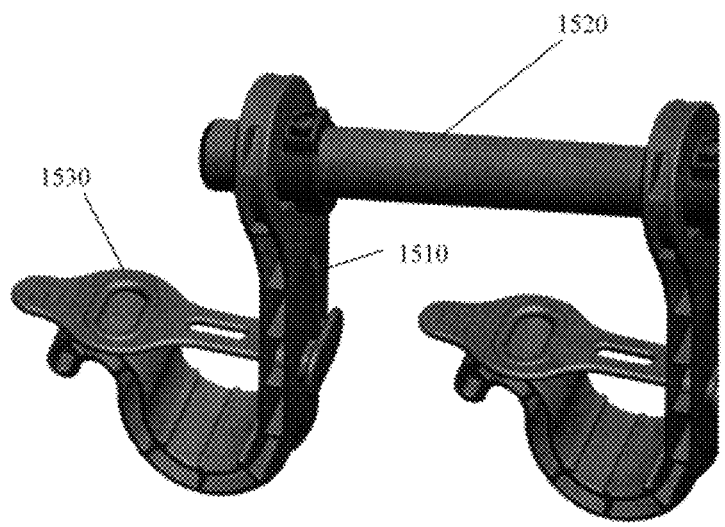

In another embodiment shown in FIGS. 15A and 15B, the equipment rack assemblies include hangers 1500 having one or more projections 1510. The projections 1510 can be used for hanging equipment such as bicycles and bicycle-related equipment, canoes, kayaks, coolers, life jackets, skis, lawn equipment, snow blowers, skates, skate boards, and scooters. The projections 1510 may have any suitable shape for hanging equipment, including, but not limited to, hook-shaped, J-shaped, U-shaped, L-shaped, or combinations thereof. The projections 1510 may be manufactured of any suitable material capable of hanging equipment including, but not limited to, polymeric materials such as thermoplastics; metal; wood; or combinations thereof. The projections 1510 can be connected to a hanger bar 1520 or equivalent such that the projections 1510 are fixed to or able to freely or partially rotate around the hanger bar 1520.

In an embodiment, the projections 1510 further include a device 1530 for securing equipment to the hanger 1500. This securing device 1530 may include, but is not limited to, a collar that can be releasably connected to the projection 1510. The securing device 1530 may be manufactured of any suitable material capable of securing equipment including, but not limited to, polymeric materials such as rubber or thermoplastics; metal; wood; or combinations thereof.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed invention.

What is claimed is:

1. At least one equipment rack assembly, comprising:
a first member having a first and a second ends;
a second member having a first and a second ends, wherein the first member telescopically advances within and out of an inside cavity of the second member through the first end of the second member so that the first end of the first member moves within the inside cavity of the second member and the second end of the first member is positioned outside of the inside cavity of the second member;
a first member securing assembly, wherein the first member securing assembly is operationally:
  1) connected to the second end of the first member, and
  2) attached to at least one first side of a structure within which the at least one equipment rack assembly is placed;
a second member securing assembly, wherein the second member securing assembly is operationally:
  1) connected to the second end of the second member, and
  2) attached to at least one second side of the structure within which the at least one equipment rack assembly is placed; and
an equipment pulling assembly having a first part and a second part, wherein the first part of the equipment pulling assembly is operationally connected to the first member securing assembly and the second part of the equipment pulling assembly is operationally connected to the second member securing assembly, and wherein the equipment pulling assembly, comprising:
  1) at least one movable cable that moves between the first part and the second part of the equipment pulling assembly, and
  2) a first hanger that is operationally connected to the at least one movable cable,
  3) a second hanger that is operationally connected to the at least one moveable cable;
wherein each of the first hanger and the second hanger are configured to hang a plurality of bicycles;
wherein equipment is attached to at least one of the first hanger or the second hanger so that the equipment can be moved between the first part and the second part of the equipment pulling assembly while being hanged on the at least one equipment rack assembly.

2. The at least one equipment rack assembly of claim 1, wherein the equipment comprises a bicycle, bicycle-related equipment, a canoe, a kayak, a cooler, a life jacket, a ski, lawn equipment, a skate, a skate board, a scooter or combinations thereof.

3. The at least one equipment rack assembly of claim 2, wherein the bicycle-related equipment comprises an air pump, a wheel, a seat, a helmet, a glove, a water pack, or combinations thereof.

4. The at least one equipment rack assembly of claim 1, comprising two equipment rack assemblies.

5. The at least one equipment rack assembly of claim 1, comprising a plurality of equipment rack assemblies.

6. The at least one equipment rack assembly of claim 1, wherein the hanger comprises at least one projection for hanging equipment.

7. The at least one equipment rack assembly of claim 6, wherein the equipment comprises a bicycle, bicycle-related equipment, a canoe, a kayak, a cooler, a life jacket, a ski, lawn equipment, a skate, a skate board, a scooter or combinations thereof.

8. The at least one equipment rack assembly of claim 6, wherein the hanger comprises a plurality of projections for hanging equipment.

9. The at least one equipment rack assembly of claim 6, wherein the at least one projection comprises a hook-shape, J-shape, U-shape, L-shape, or combinations thereof.

10. The at least one equipment rack assembly of claim 6, wherein the at least one projection is formed of polymeric material, metal, wood, or combinations thereof.

11. The at least one equipment rack assembly of claim 10, wherein the at least one projection is formed of thermoplastic.

12. The at least one equipment rack assembly of claim 6, wherein the hanger further comprises a hanger bar.

13. The at least one equipment rack assembly of claim 12, wherein the at least one projection is connected to the hanger bar so that the at least one projection is fixed to the hanger bar.

14. The at least one equipment rack assembly of claim 12, wherein the at least one projection is connected to the hanger bar so that the at least one projection can rotate around the hanger bar.

15. The at least one equipment rack assembly of claim 6, wherein the at least one projection further comprise a device for securing the equipment to the hanger.

16. The at least one equipment rack assembly of claim 15, wherein the device for securing equipment to the hanger further comprises a collar capable of releasable connection to the projection.

17. The at least one equipment rack assembly of claim 15, wherein the device for securing equipment is formed of a polymeric material, metal, wood, or combinations thereof.

18. The at least one equipment rack assembly of claim 15, wherein the device for securing equipment is formed of rubber.

* * * * *